US008953182B2

(12) United States Patent
Bradshaw et al.

(10) Patent No.: US 8,953,182 B2
(45) Date of Patent: Feb. 10, 2015

(54) FONT EMULATION IN EMBEDDED SYSTEMS

(75) Inventors: Elliott Bradshaw, Belmont, MA (US); Zoltan Gidofalvi, San Diego, CA (US); Peter Willey, Somerville, MA (US)

(73) Assignee: CSR Imaging US, LP, Burlington, MA (US)

( * ) Notice: Subject to any disclaimer, the term of this patent is extended or adjusted under 35 U.S.C. 154(b) by 817 days.

(21) Appl. No.: 13/149,684

(22) Filed: May 31, 2011

(65) Prior Publication Data

US 2012/0206751 A1    Aug. 16, 2012

Related U.S. Application Data

(60) Provisional application No. 61/442,794, filed on Feb. 14, 2011.

(51) Int. Cl.
  *G06F 3/12*    (2006.01)

(52) U.S. Cl.
  CPC ............ *G06F 3/1208* (2013.01); *G06F 3/1247* (2013.01); *G06F 3/1285* (2013.01)
  USPC ........................................ 358/1.13; 358/1.15

(58) Field of Classification Search
  CPC ... G06F 5/1285; G06F 5/1292; G06F 5/1288; G06F 5/129; G06F 3/1208; G06F 3/1247; G06F 3/1285; G06F 3/1248
  See application file for complete search history.

(56) References Cited

U.S. PATENT DOCUMENTS

| | | | | |
|---|---|---|---|---|
| 8,416,243 | B2* | 4/2013 | Plummer | 345/467 |
| 2004/0179216 | A1* | 9/2004 | Reese et al. | 358/1.11 |
| 2004/0257591 | A1* | 12/2004 | Engelman et al. | 358/1.1 |
| 2006/0129632 | A1* | 6/2006 | Blume et al. | 709/203 |
| 2009/0109227 | A1* | 4/2009 | Leroy | 345/467 |
| 2010/0014104 | A1* | 1/2010 | Soord | 358/1.9 |

FOREIGN PATENT DOCUMENTS

| | | |
|---|---|---|
| JP | 2002-183120 | 6/2002 |
| JP | 2005-018153 | 1/2005 |
| JP | 2008-287333 | 11/2008 |

OTHER PUBLICATIONS

Official Communication for Japanese Patent Application No. 2012-042408, mailed Feb. 28, 2013.

* cited by examiner

*Primary Examiner* — Benny Q Tieu
*Assistant Examiner* — Sunil Chacko
(74) *Attorney, Agent, or Firm* — John W. Branch; Lowe Graham Jones PLLC

(57) ABSTRACT

A system for printing a document when it includes one or more target fonts that are emulated with at least one substitute font suitable for printing on a printing device. The substitute font appears visually similar to the target font, substantially preserves the original pagination and line breaks of the provided document, and the printing device is capable of printing the substitute font. A table is provided that lists strategies/logic for enabling the printing device to emulate each of a plurality of predetermined target fonts with a substitute font. These emulation strategies may include but are not limited to, identifying at least one of a resident font for the printing device, stretchable font, local font, or downloadable font to be substituted for the non-resident target font in the provided document.

24 Claims, 9 Drawing Sheets

PRE-PROCESSING

| TARGET FONT NAME | STRATEGY (LOGIC) | SUBSTITUTE FONT | CHARACTER DATA |
|---|---|---|---|
| | | | |
| | | | |
| | | | |
| | | | |
| | | | |
| | | | |
| | | | |

*Fig. 9A* — 900

| UNICODE | GLYPH INDEX |
|---|---|
| | |
| | |
| | |
| | |
| | |
| | |

*Fig. 9B* — 910

| WIDTH | GLYPH NAME |
|---|---|
| | |
| | |
| | |
| | |
| | |
| | |

*Fig. 9C* — 920

FONT EMULATION IN EMBEDDED SYSTEMS

CROSS-REFERENCE TO RELATED APPLICATION

This application is a utility patent application based on previously filed U.S. Provisional Patent Application Ser. No. 61/442,794 filed on Feb. 14, 2011, the benefit of which is hereby claimed under 35 U.S.C. §119(e) and incorporated herein by reference.

TECHNICAL FIELD

The present invention relates generally to image data processing for printers and, more particularly, but not exclusively to enabling the emulation of fonts in a document that is provided to a printer for printing on tangible media.

BACKGROUND

With the advent of ubiquitous computing, graphical user interfaces, and multimedia data exchange in business, arts, and personal use, efficient and high-quality processing and printing of documents have become increasingly important. Printers, such as network-connected printers, and multi-function printing devices (MFPs) and/or slide projectors may receive documents to be printed or displayed from various sources such as job queues, security queues, document management systems, built-in disk storage, digital cameras, removable mass storage devices, mobile telephones, personal digital assistants, pagers, tablet computers, notebook computers, personal computers, and virtually any other network computing devices and/or mobile computing devices. And in general, although the provided documents may display one or more fonts, the additional information required to print these fonts may not be resident on the printer, or readily available on the computing device that provides the document. In the past, a printer might substitute a resident font for a non-resident font and stretch/compress the substitute font to somewhat emulate the point size of the non-resident font. However, substitute fonts can create visual artifacts if they are significantly stretched or compressed. Also, since the contours of the substitute font may not closely match the non-resident font that they replaced, the original pagination and/or line breaks can be substantially different when the provided document is printed with substitute fonts.

BRIEF DESCRIPTION OF THE DRAWINGS

For a better understanding of the present invention, reference will be made to the following Detailed Description, which is to be read in association with the accompanying drawings, wherein:

FIGS. 9A-9C illustrate exemplary tables that may be implemented as part of an embodiment.

DETAILED DESCRIPTION OF THE EMBODIMENTS

Figure 1:
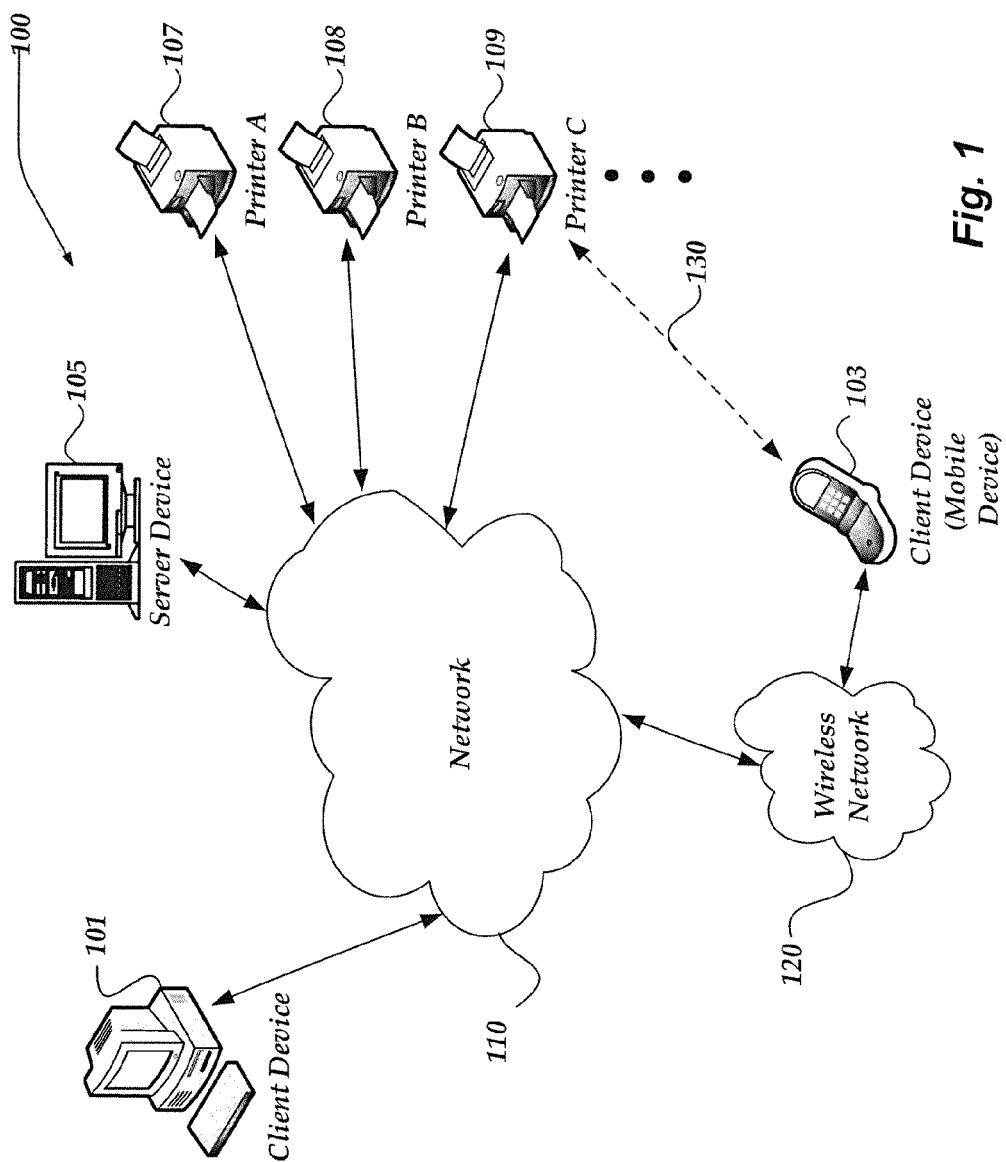
FIG. 1 is a system diagram of an exemplary environment in which embodiments of the invention may be implemented.

The present invention now will be described more fully with reference to the accompanying drawings, which form a part hereof, and which show, by way of illustration, specific embodiments by which the invention may be practiced. This invention may, however, be embodied in many different forms and should not be construed as limited to the embodiments set forth herein. Rather, these embodiments are provided so that this disclosure will be thorough and complete, and will fully convey the scope of the invention to those skilled in the art. Among other things, the present invention may be embodied as methods, devices, systems, and processor readable storage media. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "document" may refer to a digital representation of a body of information assembled with the capacity to communicate. A document may include symbolic, diagrammatic, and/or sensory-representational information, including but not limited to text, fonts, font references, color, graphics, images, metadata, and the like. In some embodiments, a document may be considered a digital artifact, and may be associated with a print job that a user has requested to be printed at the printer. A document may include virtually any type of document that may be printed by a printing device. For example, documents may include text documents created by a text editor (e.g. Microsoft Word, Corel WordPerfect, TeX, OpenOffice, Adobe Acrobat, and the like), graphics documents created by a graphics painting program (e.g. Microsoft Paint, MacPaint, or other bitmap and/or vector-based graphics design software), image documents created by photographic systems, optical scanners, and the like, or documents that include any combination of text, graphics, images, and/or other visual representations of information. In at least some embodiments, documents may be received as an input data stream, with data in a PDL such as HP PCL, Postscript, PDF, XPS, XL, or the like. Also, in at least some embodiments, a document may include one or more objects (e.g. graphic objects, fonts, font references, colors, and the like) that are bound to the printing device, i.e. described in a manner that is associated with the printing device's capabilities, supported formats, and the like. The font references and/or fonts included in the document sent to the printing device are called "target" fonts.

The following briefly describes the embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, the invention supports printing documents when the received document includes one or more target fonts that are emulated with a substitute font for printing. The embodiments of the invention enable an emulation of a target font with another substitute font that appears visually similar, substantially preserves the original pagination and line breaks of the provided document, and the printing device is capable of printing the substitute font. In at least one embodiment, at least one logical construct such as one or more tables can be provided that lists strategy/logic for enabling the printing device to emulate each of a plurality of predetermined target fonts with a substitute font. These emulation strategies may include but are not limited to, identifying at least one of a resident font for the printing device, stretchable font, local font, or downloadable font to be substituted for printing the document.

Also, in at least one embodiment, three different sub-tables are pre-processed and provided for each substitute font that is identified in an entry of the strategy table for emulating a target font. First, a Unicode mapping table is provided that corresponds to a Glyph index to each character of the substitute font. The detailed format can be implementation specific, but it generally lists a contiguous range of Unicodes that are mapped to a contiguous glyph index range. Also, a Width table is provided that is both indexed by the Glyph index and identifies the width for each character of the substitute font. Additionally, an Encoding table is provided that is both indexed by the Glyph index and provides the Glyph name for each character of the substitute font. The Glyph name can be derived from a file for the substitute font itself or from a default table.

Also, in at least one embodiment, an additional target font specification table may be provided that includes entries that describe visual aspects of each target font. This target font specification table may be used to select stretchable fonts and configure these fonts to more accurately emulate the target font. Additionally, in at least one embodiment, a printer font specification table may also be provided that indicates resident fonts to use for particular target fonts.

Moreover, various embodiments that may employ one or a few more tables could also be implemented using an equivalent logical organization such as further splitting the data into several more tables. Additionally, the various embodiments can be implemented with one or more substantially equivalent logical constructs such as if, then, else statements, Case statements, and the like.

Additionally, in at least one embodiment, a display of one or more substitute fonts that are suitable for the printing device to print the document may be displayed to a user for selection. In at least some embodiments, the selected substitute font is downloaded from a network or already listed in the font strategy table for emulating another target non-resident font.

Embodiments of the claimed invention may then generate modifications to the document(s) based on the edits specified by the user, and provide to the user a print preview of the modified documents. In some embodiments, the print preview may be provided to the user through a UI presented on a display (e.g. an LCD display) that is part of the printing device. However, the claimed invention is not so limited, and in some embodiments, the print preview may be provided to the user through a UI presented on a client device (e.g. a user's mobile device, desktop computer, and the like). Edits specified to the document(s) by the user through the print preview UI may be incorporated into the document(s) as one or more modifications, and the modified document(s) may then be displayed to the user who may select to print the modified document(s) and/or make further edits.

As described further herein, embodiments of the claimed invention may enable a network connected printer, multi-function printing device, and/or other printing device to receive a document with target font references from one or more sources (e.g., job queues, security queues, document management systems, built-in disks, external disks, digital cameras, mobile devices, network devices, removable mass storage devices, and the like), and print the documents with substitute fonts that are suitable for printing on the printing device.

Embodiments of the invention may also enable features that may be advantageous to a user, such as enabling a user to walk up to a printing device and print one or more documents stored on a portable storage device such as a Flash Memory drive and/or a mobile device, e.g. a mobile telephone, digital camera, notebook computer, tablet computer, personal digital assistant, and the like. Documents to be printed may also be retrieved from a local disk, from a web site or other network device/location, and/or remote repository such as a document management system (e.g. Microsoft SharePoint, Adobe Life-Cycle, etc.), and the like. Some embodiments of the invention can support various degrees of integration between document management systems and software applications that implement inventive features such as the print processing application described further herein.

Illustrative Operating Environment

FIG. 1 shows an exemplary system in which one or more embodiments may be implemented and/or practiced. Not all the components may be required to practice the invention, and variations in the arrangement and type of the components may be made without departing from the spirit or scope of the invention. As shown, system 100 of FIG. 1 includes network 110, wireless network 120, client device 101, mobile client device 103, server device 105, and printers 107-109.

An embodiment of client device 101 is described in more detail below with regard to the network device depicted in FIG. 4. Briefly, however, client device 101 may include computing devices that are typically stationary, such as personal computers, workstations, network terminals, multiprocessor systems, multiprocessor-based or programmable consumer electronics, entertainment consoles, gaming consoles, and the like. In some embodiments, client device 101 may connect to network 110 over a wired network. In some embodiments, client device 101 may additionally or alternatively connect to network 110 over a wireless network such as wireless network 120.

Figure 4:
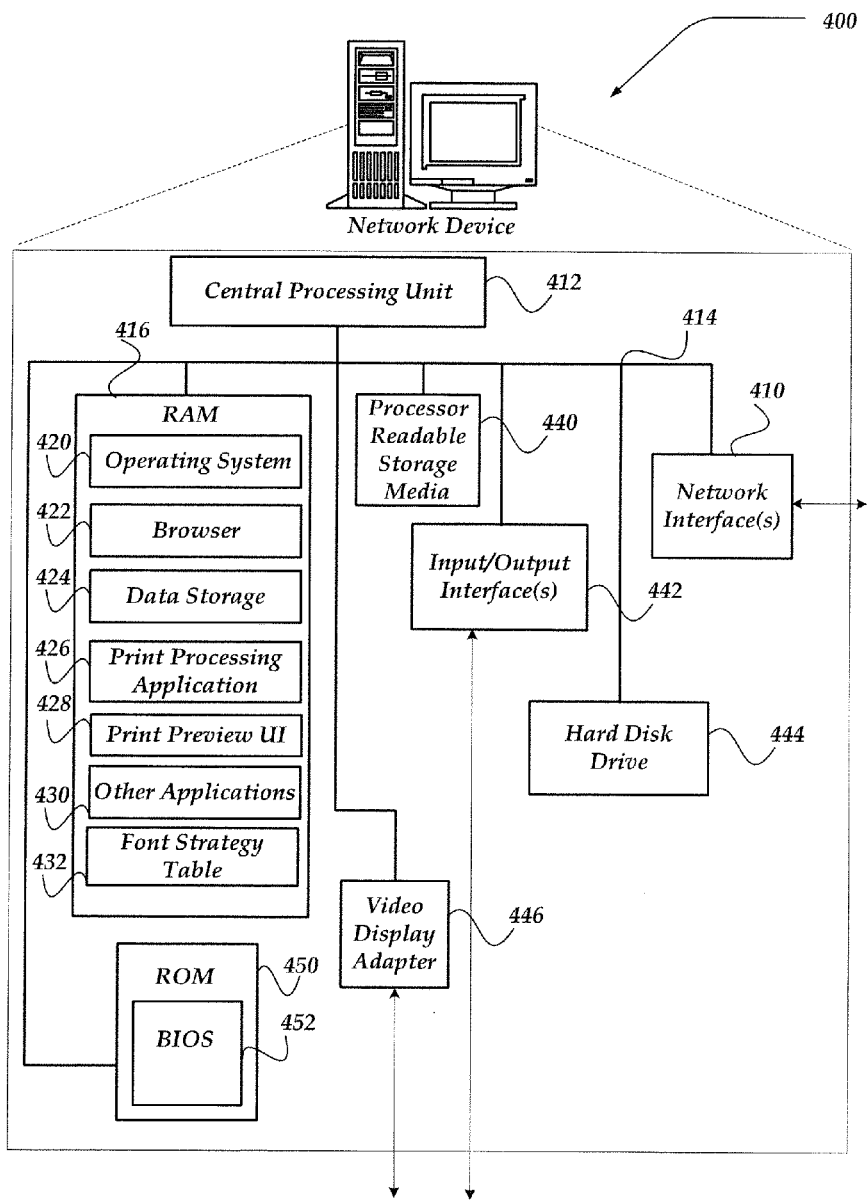
FIG. 4 shows an embodiment of a network device that may be included in a system such as that shown in FIG. 1.

An embodiment of server device 105 is described in more detail with respect to the network device depicted in FIG. 4. Briefly, however, server device 105 may include computing devices that are typically stationary, such as personal computers, workstations, network terminals, multiprocessor systems, and the like. In some embodiments, server device 105 may connect to network 110 over a wired network. In some embodiments, server device 105 may additionally or alternatively connect to network 110 over a wireless network such as wireless network 120. In some embodiments, server device 105 may be configured to perform updates to applications, software modules, etc. (e.g. firmware) of printers 107-109, client device 101, and/or mobile client device 103.

An embodiment of mobile client device 103 is described in more detail below with regard to FIG. 3. Briefly, however, mobile client devices 103 may include virtually any computing device capable of receiving and sending a message over a network. Such devices may include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, a printer, or the like. In some embodiments, mobile client device 103 may be configured to connect to network 110 over a wireless network such as wireless network 120. In some embodiments, mobile client device 103 may additionally or alternatively connect to network 110 over a wired network.

Client devices 101 and 103 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed. In at least some embodiments, client devices 101 and 103 may be configured to provide data such as documents to at least one of printing devices 107-109 for printing.

In one embodiment, client devices 101 and 103 may provide the documents for printing using any of a variety of mechanisms. For example, client devices 101 and 103 may communicate via a page description language (PDL) or printer command language (PCL), such as HP PCL, Postscript, PDF, XPS, or the like. However, client devices 101 and 103 are not constrained to these communication mechanisms and others may also be used. For example, in some embodiments, client devices 101 and 103 may also communicate using a graphics API such as graphical device interface (GDI) format, OpenGL format, or the like.

As illustrated, client devices 101 and 103 may communicate with printing devices 107-109 over network 110 and/or wireless network 120. However, the invention is not so limited. For example, in some embodiments, and as shown, a client device such as client device 103 may communicate directly to a printing device such as printing device 109 via a direct communications method such as an IR signal, shown in FIG. 1 as dotted line 130. In some embodiments, one or more of printing devices 107-109 may be hosted or otherwise connected to a server such as server 105, such that communication between a client device and the printer takes place via the host server. In such cases, the hosting server may act as a printer hub or print server for one or more printing devices.

Network 110 may be configured to couple client devices 101 and 103 to each other, in some embodiments via wireless network 120. Further, network 110 may couple client devices 101 and 103 to server 105 and/or to printing devices 107-109. Network 110 is enabled to employ any form of computer readable media for communicating information from one electronic device to another. Network 110 may include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router, switch or other network device may act as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including, but not limited to satellite links, or other communications links known to those skilled in the art. Furthermore, remote computers and other related electronic devices could be remotely connected to either LANs or WANs via a modem and temporary telephone link.

Wireless network 120 may be configured to couple mobile client devices such as mobile device 103 and its components with network 110. Wireless network 120 may include any of a variety of wireless sub-networks that may further overlay stand-alone ad hoc networks, and the like, to provide an infrastructure-oriented connection for mobile client device 103. Such sub-networks may include mesh networks, Wireless LAN (WLAN) networks, cellular networks, and the like. Wireless network 120 may further include an autonomous system of terminals, gateways, routers, and the like connected by wireless radio links, and the like. These connectors may be configured to move freely and randomly and organize themselves arbitrarily, such that the topology of wireless network 120 may change rapidly.

Wireless network 120 may employ one or more access technologies including 2nd (2G), 3rd (3G), 4th (4G), $5^{th}$ (5G) generation radio access for cellular systems, or the like. Access technologies such as 2G, 2.5G, 3G, 4G, 5G, and future access networks may enable wide area coverage for client devices, such as client devices 101 and 103, server device 105, and/or printing devices 107-109 with various degrees of mobility. For example, wireless network 120 may enable a radio connection through a radio network access such as Global System for Mobile communication (GSM), General Packet Radio Services (GPRS), Enhanced Data GSM Environment (EDGE), Code Division Multiple Access (CDMA), Wideband Code Division Multiple Access (WCDMA), Time Division Multiple Access (TDMA), Evolved High Speed Packet Access (HSPA), Long Term Evolution (LTE), WLAN, WiFi, WiMax, Wireless Router (WR) mesh, Bluetooth, or the like. In essence, wireless network 120 may include virtually any wireless communication mechanism by which information may travel between client devices 101 and 103, server device 105, and/or printing devices 107-109, and other computing devices and/or networks, or the like.

Additionally, communication media typically may enable transmission of computer-readable instructions, data structures, program modules, or other types of content, virtually without limit. By way of example, communication media includes wired media such as twisted pair, coaxial cable, fiber optics, wave guides, and other wired media and wireless media such as acoustic, RF, infrared, and other wireless media.

An embodiment of printers 107-109 is described in more detail below with regard to FIG. 2. Briefly, printing devices 107-109 may represent virtually any apparatus that is configured to print data onto a hardcopy format, such as paper, plastic, cloth, metal, composite materials, and the like. In one embodiment, printing devices 107-109 represent laser printing devices that are configured to employ a laser beam or similar technology to transfer print data onto a hardcopy format. It should be noted that while laser printing is described as one embodiment, the invention is not so limited, and other printing mechanisms may also be employed without departing from the scope of the claimed invention.

In some embodiments, printing devices 107-109 are configured and arranged to print data at different resolutions. Moreover, printing devices 107-109 may be configured to provide output in black and white, and/or in color. Printing devices 107-109 may further be configured to print images, graphics and/or text. In one embodiment, printing devices 107-109 are configured to employ laser printing mechanisms.

Illustrative Printer Device

Figure 2:
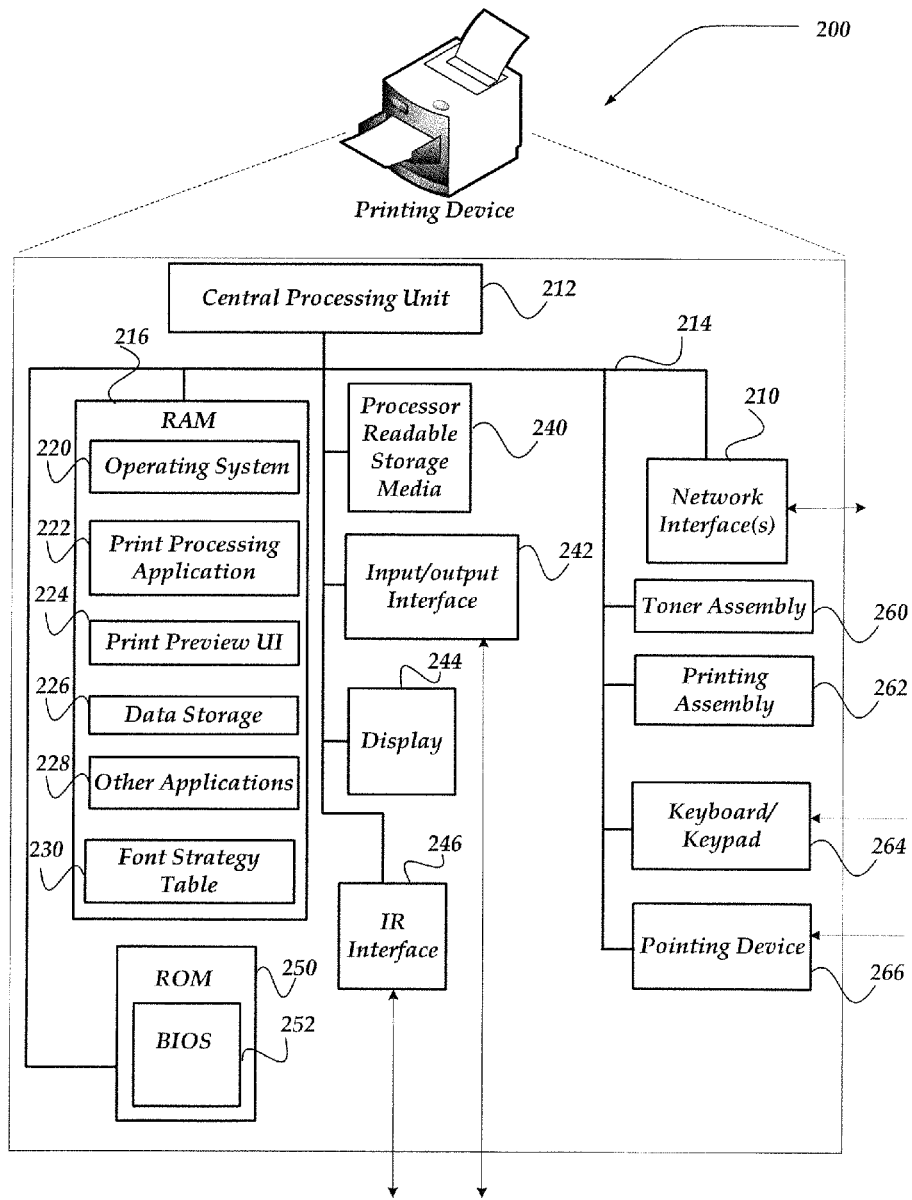
FIG. 2 shows an embodiment of a printing device that may be included in a system such as that shown in FIG. 1.

FIG. 2 shows one embodiment of printer 200 that may be included in a system implementing the invention. Printer 200 may include many more or less components than those shown in FIG. 2. However, the components shown are sufficient to disclose an illustrative embodiment for practicing the present invention. Printer 200 may represent, for example, one or more of printers 107-109 of FIG. 1. In some embodiments, printer 200 may be configured to employ laser print technology. However, the invention is not so constrained, and other print technologies may also be employed without departing from the scope of the invention, including but not limited to LED printers (or other toner-based printing technologies), liquid inkjet printers, solid ink printers, dye-sublimation printers, inkless printers such as thermal printers and UV printers, dot-matrix printers, line printers, pen-based plotters, and the like.

As shown, printer 200 may include central processing unit 212, one or more network interfaces 210, processor readable storage medium 240, input/output interface 242, display 244, infrared (IR) interface 246, toner assembly 260, printing assembly 262, keyboard and/or keypad 264, pointing device 266, and a mass memory, all in communication with each other via bus 214. The mass memory may generally include RAM 216, and ROM 250, and may also include a processor readable storage medium 240. As illustrated in FIG. 2, printer 200 may communicate with the Internet, or some other communications network, via network interface(s) 210, employing various wired and/or wireless communication protocols including but not limited to TCP/IP, Wi-Fi, Global System for Mobile communication (GSM), WAP, ultra wide band (UWB), IEEE 802.16 Worldwide Interoperability for Microwave Access (WiMax), General Packet Radio Services (GPRS), Enhanced Data GSM Environment (EDGE), Code Division Multiple Access (CDMA), Wideband Code Division Multiple Access (WCDMA), Time Division Multiple Access (TDMA), Evolved High Speed Packet Access (HSPA), Long Term Evolution (LTE), WLAN, Wireless Router (WR) mesh, Bluetooth, Zigbee, or the like. Communications may also be over a universal serial port (USB); a parallel port; a serial bus such as RS-232 (Recommended Standard 232), ANSI/TIA/EIA-422, or the like; IEEE 1394 (e.g., Firewire); or the like. Network interface unit(s) 210 is sometimes known as a transceiver, transceiving device, or network interface card (NIC).

IR interface 246 may enable communication between printer 200 and a client device such as mobile client device 103 depicted in FIG. 1. IR interface 246 may support communication via an IR communication protocol such as the Infrared Data Association (IrDA) protocol, or the like. In some embodiments, IR interface 246 may support communications with a client device that is with a short range of, and/or in line-of-sight with printer 200. Connection 130 depicted in FIG. 1 illustrates an example of such a direct communication between mobile client device 103 and one or more of printers 107-109.

Keyboard/keypad 264 may comprise any input device arranged to receive input from a user. For example, keyboard/keypad 264 may include a push button numeric dial, keyboard, touch screen, or the like. Keyboard/keypad 264 may include alphabetic inputs, numeric inputs, and/or other character inputs, and may further include function and/or command buttons associated with functionality for selecting, examining, editing, and/or printing documents. User inputs made via keyboard/keypad 264 may be shown in display 244.

Pointing device 266 may include virtually any device that enables a user to input spatial and/or positional data to printer 200. Pointing device 266 may include devices based on the user touching a surface, such as a touchpad, touch screen, graphics tablet, joy stick or pointing stick, either with a body part (e.g. finger or hand) or with an object such as a wand, stylus, pen, lightpen and the like. Pointing device 266 may further include devices based on the user moving an object, such as a mouse, trackball, joystick, and the like. User inputs made via pointing device 266 may be shown in display 244.

Display 244 may include virtually any type of display, monitor, terminal, screen and the like that displays text, graphics, images, and/or any other type of data to a user. Types of displays may include, but are not limited to, a liquid crystal display (LCD), gas plasma, light emitting diode (LED), cathode ray tube (CRT), or the like. Display 244 may also interface to keyboard/keypad 264 and/or pointing device 266 to receive and display user input. Furthermore, display 244 may include a touch screen interface that supports single and multi-touch commands based on the location of a user's fingers touching one or more positions on the display. Additionally, or alternatively, printer 200 may communicate with one or more display devices that are external to the printer, to display information regarding print jobs and/or the documents to be examined and modified by a user.

Input/output interface 242 may include various means for communicating with external devices, such as external displays, user input devices, computer devices, networking devices, and the like. Input/output interface 242 may employ one or more communications technologies including but not limited to USB, Bluetooth, Firewire, serial port (e.g. RS-232 standard), parallel port (e.g. IEEE 1284 standard), and the like.

The mass memory as described above illustrates an exemplary type of computer-readable media, namely computer-readable or processor-readable storage media. Such mass memory included in printer 200 may include RAM 216 and ROM 250, and/or processor readable storage media 240. Computer-readable storage media, or processor-readable storage media, may include volatile, nonvolatile, removable, and non-removable media implemented in any method or technology for storage of information, such as computer readable instructions, data structures, program modules, or other data. Examples of computer-readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory such as RAM 216 may store operating system 220 for controlling the operation of printing device 200. Any general-purpose operating system (e.g. Windows, UNIX, LINUX, and the like) that supports the functionality of printer 200 may be employed. In some embodiments, operating system 220 may be a specially configured version of a general-purpose operating system, or may be a specialized operating system designed and created to support the functionality of printer 200. Operating system 200 may include or interface with a virtual machine module such as the Java virtual machine or Microsoft .NET runtime that may enable control of hardware components and/or operating system functions via applications that run under such virtual machine modules. Basic input/output system ("BIOS") 252 may also be provided for controlling the low-level operation of printer 200, such as startup, diagnostics, and the like. As shown in FIG. 2, BIOS may be stored in and/or executed from mass memory such as ROM 250.

The mass memory may also store program code, instructions, and/or data. For example data storage 226 may be configured to store printer commands, diagnostics, user preferences, printer control software, information regarding the capabilities of the printer such as supported color palettes, fonts, pagination, page size, and the like. Data storage 226 may further store documents to be printed, intermediate documents, information regarding user edits and/or modifications, raster images of documents to be printed, and the like, as well as any other information needed for selecting, examining, editing, modifying, displaying and/or printing the documents.

In some embodiments, mass memory may also store one or more applications, programs, software modules and the like for the operation of embodiments of the invention. Such applications may include print processing application 222, print preview User Interface 224, Font Strategy Table 230. The general operation of these applications is described further herein with regard to FIGS. 5-9C. In some embodiments, one or both of print processing application 222 and print preview UI 224 may store, cache, and/or access data in data storage 226 and/or processor readable storage media 240, and may display information at display 244. Mass memory such as RAM 216 may also include other applications 228 that may also be configured to store, cache and/or access data in data storage 226 and/or processor readable storage media 240, and may display information at display 244. Applications 222, 224 and 228 may be loaded into mass memory and run on operating system 220. Although such applications are illustrated as included in RAM 216, the invention is not so limited. For example, one or more of applications 222, 224 and/or 228 may also be loaded into and/or run on ROM 250 and/or processor readable storage medium 240 without departing from the scope of the claimed invention.

As stated herein, printer 200 may incorporate various types of printing technologies without departing from the scope of the claimed invention. In some embodiments, printer 200 may be configured to employ laser printing technology. The following is an exemplary, non-limiting description of laser printing technology that may be employed to implement embodiments of the invention. In such embodiments, printing assembly 262 may include such elements as are necessary for laser printing, such as a drum assembly, corona wire, fuser, discharge lamp, laser scanning unit, and/or photoreceptor. In some embodiments, the drum assembly may be configured to revolve, and may be made of any of a variety of photoconductive materials. The drum assembly may be given an electric charge by the corona wire (or in some embodiments by a charged roller). As the drum assembly rotates, a laser scanning unit may direct a laser beam across the drum assembly's surface based on the data to be printed. A toner assembly 260 may provide toner, such as in a powder form, onto the drum assembly. A corona wire may further provide a charge to paper or other print material, which may then be moved over the drum assembly. The paper or other print material may then pass through a fuser such that the applied toner is heated or otherwise caused to adhere to the paper or other print material. Upon depositing toner to the paper or other print material, the surface of the drum of the drum assembly may pass a discharge lamp where a light, or the like, may expose the drum to erase or remove the electrical image. In one embodiment, the drum surface of the drum assembly may then pass the corona wire, which may then reapply a charge. It should be noted that embodiments of the claimed invention are not limited to this method of transferring data onto a print material, and other mechanisms may also be used. Thus, the invention is not to be constrained or otherwise narrowed by this embodiment.

Illustrative Mobile Device

Figure 3:
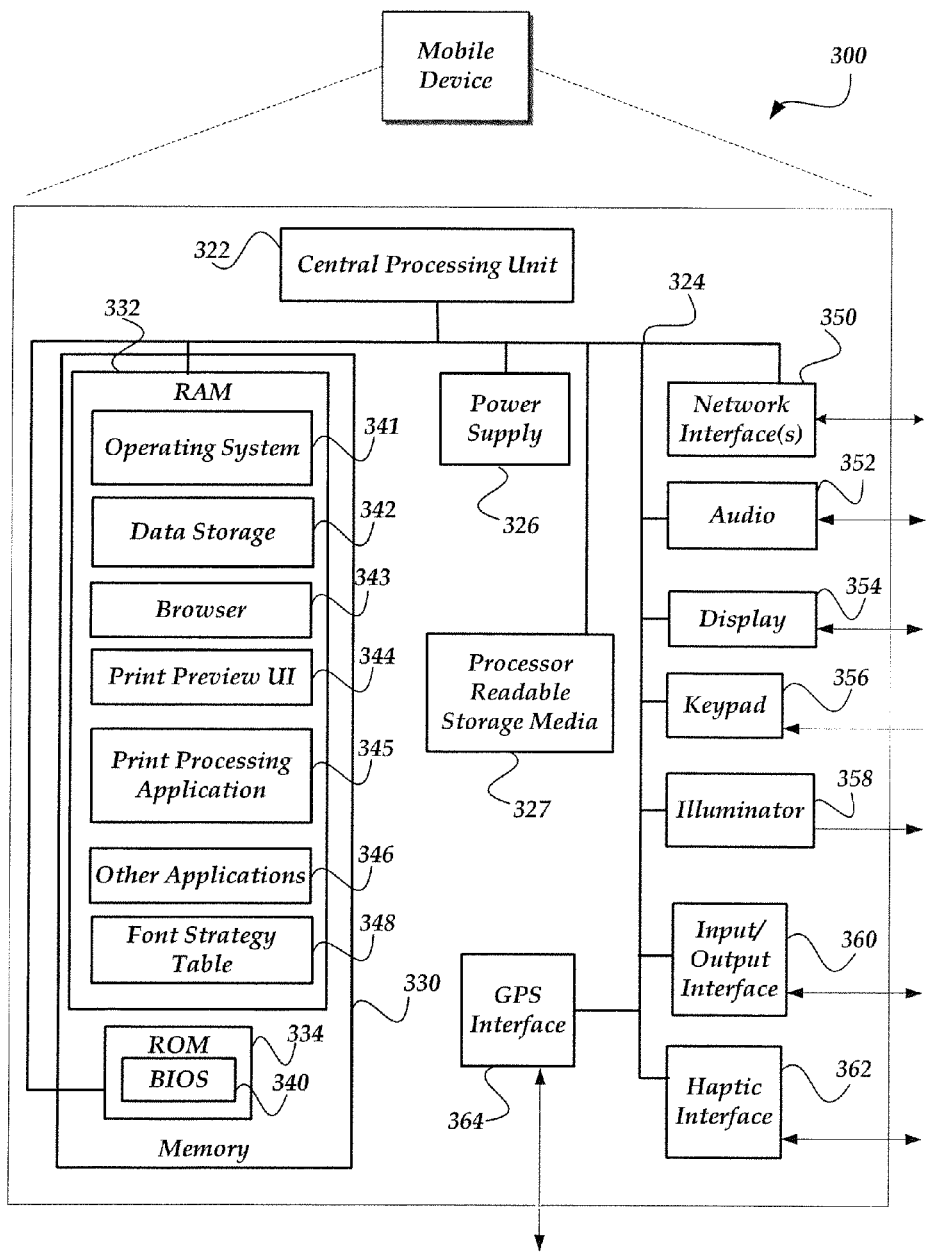
FIG. 3 shows an embodiment of a mobile device that may be included in a system such as that shown in FIG. 1.

FIG. 3 shows an exemplary mobile device 300, according to one embodiment of the claimed invention. Generally, mobile device 300 may include more or fewer components than those shown. The components shown, however, are sufficient to disclose an illustrative embodiment for practicing the claimed invention. Mobile device 300 may represent, for example, mobile client device 103 of FIG. 1.

Mobile device 300 includes central processing unit 322, power supply 326, processor readable storage media 327, GPS interface 364, one or more network interfaces 350, audio interface 352, display 354, keypad 356, illuminator 358, input/output interface 360, haptic interface 362, and mass memory, all in communication with each other via bus 324. The mass memory generally includes RAM 332, ROM 334, and one or more removable or permanent mass storage devices such as processor readable storage media 327. The mass memory may store operating system 341 for controlling the operation of client device 300. Operating system 341 may be stored in RAM 332. A general-purpose operating system may be employed, such as a version of UNIX or LINUX and the like. In some embodiments, operating system 341 may be a specialized client communication operating system such as Windows Mobile, Sybian, Google Android, the Apple iPhone operating system, or the like. The operating system may include or interface with a virtual machine module such as the Java virtual machine or Microsoft .NET runtime that may enable control of hardware components and/or operating system functions via applications that run under such virtual machines. Basic input/output system (BIOS) 340 may also be provided for controlling the low-level operation of mobile device 300, and may be stored in mass memory and in some embodiments in ROM 334.

Mobile device 300 may communicate with a base station (not shown), or directly with another computing device, via one or more network interfaces 350. Network interface(s) 350 may include circuitry for coupling mobile device 300 to one or more networks, and may be constructed for use with one or more wired and/or wireless communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), Enhanced Data GSM Environment (EDGE), Code Division Multiple Access (CDMA), Wideband Code Division Multiple Access (WCDMA), Time Division Multiple Access (TDMA), Evolved High Speed Packet Access (HSPA), Long Term Evolution (LIE), WLAN, WiFi, Wireless Router (WR) mesh, SIPIRTP, Bluetooth™, infrared, Wi-Fi, and Zigbee. Network interface(s) 350 is sometimes known as a transceiver, transceiving device, or network interface card (NIC). Client device 300 may also communicate with a printing device or other devices via input/output interface 360, which may employ Firewire, a serial port, a parallel port, USB, or the like.

The mass memory as described above illustrates a type of computer-readable storage media, namely computer-readable or processor-readable storage media such as processor-readable storage media 327 shown in FIG. 3. Computer-readable storage media may include volatile, nonvolatile, removable, and non-removable media implemented in any method or technology for storage of information, such as computer readable instructions, data structures, program modules, or other data. Examples of computer-readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory such as RAM 332, ROM 334 and/or processor-readable storage media 327 may also store program code and data. For example, RAM 332 may include a browser application such as browser 343. Other examples of application programs include transcoders, schedulers, calendars, database programs, word processing programs, HTTP programs, customizable user interface programs, IPSec applications, encryption programs, security programs, VPN programs, SMS message clients, IM message clients, email clients, account management and so forth. Applications in mass memory such as RAM 332 may also include print preview user interface (UI) 344, font strategy table 348, and/or print processing application 345, the operation of which are described more fully herein with regard to FIGS. 5-9C. RAM 332 may also store other applications 346. Generally, any of the applications described herein may be loaded into mass memory and run on operating system 341, may utilize data storage 342 and/or processor-readable storage media 327 for storing, caching, accessing data, may utilize display 354 for displaying information, may utilize audio interface 352 for conveying audio information, and may utilize haptic interface 362 for conveying haptic (e.g. tactile) information to a user of mobile device 300.

Power supply 326 may provide power to mobile device 300. A rechargeable or non-rechargeable battery may be used to provide power. Power may also be provided by an external power source, such as an AC adapter or a powered docking cradle that supplements and/or recharges a battery.

Audio interface 352 may be arranged to produce and receive audio signals such as the sound of a human voice, music, and the like. For example, audio interface 352 may be coupled to a speaker and microphone (not shown) to enable telecommunication with others and/or generate an audio acknowledgement for some action. Display 354 may be a liquid crystal display (LCD), gas plasma, light emitting diode (LED), or any other type of display used with a computing device.

Display 354 may also include a touch sensitive screen arranged to receive input from an object such as a stylus or a digit from a human hand.

Keypad 356 may comprise any input device arranged to receive input from a user. For example, keypad 356 may include a push button numeric dial, or a keyboard. Keypad 356 may also include command buttons that are associated with various functions of one or more application stored in mass memory and executed on operating system 341. Illuminator 358 may provide a status indication and/or provide light. Illuminator 358 may remain active for specific periods of time or in response to events. For example, when illuminator 358 is active, it may backlight the buttons on keypad 356 and stay on while the client device is powered. Also, illuminator 358 may backlight these buttons in various patterns when particular actions are performed, such as dialing another client device. Illuminator 358 may also cause light sources positioned within a transparent or translucent case of the client device to illuminate in response to actions.

Mobile device 300 may also include input/output interface 360 for communicating with external devices, such as a headset, with other input or output devices not shown in FIG. 3, or with other computing devices. Input/output interface 360 may utilize one or more communication technologies, such as USB, infrared, Bluetooth™, Wi-Fi, Zigbee, or the like. Haptic interface 362 may provide tactile feedback to a user of the client device. For example, the haptic interface may be employed to vibrate mobile device 300 in a particular way when another user of a computing device is calling.

GPS transceiver 364 may be configured to determine the physical coordinates of mobile device 300 on the surface of the Earth, by outputting a location as latitude and longitude values. GPS transceiver 364 can also employ other geo-positioning mechanisms, including, but not limited to, triangulation, assisted GPS (AGPS), E-OTD, CI, SAI, ETA, BSS or the like, to further determine the physical location of mobile device 300 on the surface of the Earth. It is understood that under different conditions, GPS transceiver 364 can determine a physical location within millimeters for mobile device 300; and in other cases, the determined physical location may be less precise, such as within a meter or significantly greater distances. The position information outputted by GPS transceiver 364 may be stored in mass memory (e.g. in data storage 342 and/or processor readable storage media 327), and may be employed by various applications stored in mass memory and run in operating system 341, as described herein.

Though not shown in FIG. 3, mobile device 300 may further include a video/image capture interface that is arranged to capture video and/or still images. For example, video/image capture interface may incorporate a camera, and may comprise a lens, an image sensor, and other electronics. Image sensors may include a complementary metal-oxide-semiconductor (CMOS) integrated circuit, charge-coupled device (CCD), or any other integrated circuit for sensing light. Images and/or videos captures by such an interface may be stored to mass memory such as RAM 332, ROM 334, and/or processor-readable storage media 327, and may also be communicated to other computing devices (e.g. printers 107-109) via network interface(s) 350.

Illustrative Network Device

FIG. 4 shows an exemplary network device 400, according to at least one embodiment of the invention. Generally, network device 400 may include more or fewer components than those shown. The components shown, however, are sufficient to disclose an illustrative embodiment for practicing the invention. Network device 400 may represent, for example, client device 101 and/or server device 105 of FIG. 1.

Network device 400 may include central processing unit 412, one or more network interfaces 410, input/output interface 442, hard disk drive 444, video display adapter 446, and mass memory, all in communication with each other via bus 414. The mass memory generally includes RAM 416, ROM 450, hard disk drive 444, and one or more removable or permanent mass storage devices such as processor readable storage media 440. Mass memory may further include such storage devices as tape drive, floppy disk drive, optical drive, and the like. The mass memory may store operating system 420 for controlling the operation of network device 400. In some embodiments, operating system 420 may be stored in RAM 416. A general-purpose operating system may be employed, such as a version of UNIX or LINUX and the like. In some embodiments, operating system 420 may be a specialized client communication operating system such as Windows Mobile, Sybian, Google Android, or the Apple iPhone operating system. The operating system may include or interface with a virtual machine module such as the Java virtual machine or Microsoft .NET runtime that may enable control of hardware components and/or operating system functions via applications that run under such virtual machines. Basic input/output system (BIOS) 450 may also be provided for controlling the low-level operation of network device 400, and may be stored in mass memory and in some embodiments in ROM 450.

Network device 400 may communicate with a network such as the Internet, or directly with another computing device, via one or more network interfaces 410. Network interface(s) 410 may include circuitry for coupling network device 400 to one or more networks, and may be constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), Enhanced Data GSM Environment (EDGE), Code Division Multiple Access (CDMA), Wideband Code Division Multiple Access (WCDMA), Time Division Multiple Access (TDMA), Evolved High Speed Packet Access (HSPA), Long Term Evolution (LTE), WLAN, Wireless Router (WR) mesh, WAP, ultra wide band (UWB), IEEE 802.16 Worldwide Interoperability for Microwave Access (WiMax), SIPIRTP, Bluetooth™, infrared, Wi-Fi, Zigbee, and the like. Network interface(s) 410 is sometimes known as a transceiver, transceiving device, or network interface card (NIC). Network device 400 may also communicate with a printing device or other devices via input/output interface(s) 442, which may employ Firewire, a serial port, a parallel port, USB, or the like.

The mass memory as described above illustrates a type of computer-readable media, namely computer-readable or processor-readable storage media such as processor-readable storage media 440 shown in FIG. 4. Computer-readable storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory such as RAM 416, ROM 450, hard disk drive 444, and/or processor-readable storage media 440 may also store program code and data. For example, RAM 416 may include a browser application such as browser 422. Other examples of application programs include transcoders, schedulers, calendars, database programs, word processing programs, HTTP programs, customizable user interface programs, IPSec applications, encryption programs, security programs, VPN programs, SMS message clients, IM message clients, email clients, account management and so forth. Applications in mass memory such as RAM 416 may also include print preview user interface (UI) 428, print processing application 426, font strategy table 432, the operation of which are described more fully herein with regard to FIGS. 5-9C. In some embodiments, print preview UI 428, font strategy table 432, and/or print processing application 426 may be included in network device 400 when such device is acting as a client device such as client device 101 of FIG. 1. RAM 416 may also store other applications 430. Generally, any of the applications described herein may be loaded into mass memory and run on operating system 420, may utilize data storage 424, processor-readable storage media 440, and/or hard disk drive 444 for storing, caching, and/or accessing data associated with the applications.

At least some applications executing in mass memory of network device 400 may employ video display adapter 446 to output information for display to a user. In some embodiments, video display adapter 446 may be a video card, graphics card, video adapter, display adapter, graphics accelerator card, or the like. Video display adapter 446 may support one or more video and/or graphics formats for output, such as VGA, SVGA, XGA and the like. Video display adapter 446 may include software and/or hardware components for processing video and/or graphics, such as a Graphics Processing Unit (GPU), video and/or graphics BIOS, video and/or graphics firmware, and the like. Video display adapter 446 may further include dedicated memory for processing video and/or graphics. Video display adapter 446 may include one or more output ports, such as a Video Graphics Array (VGA) port, a Digital Visual Interface (DVI) port, a Video In Video Out (VIVO) port, a High-Definition Multimedia Interface (HDMI) port, DisplayPort, composite video port, and the like. Video display adapter 446 may interface with one or more external displays (e.g. monitors) or with a display integrated with network device 400, to display information to a user.

General Operation

It will be understood that each block of the illustrative flowcharts described below, and combinations of blocks in the flowcharts, can be implemented by computer program instructions.

These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the claimed invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Figure 5:
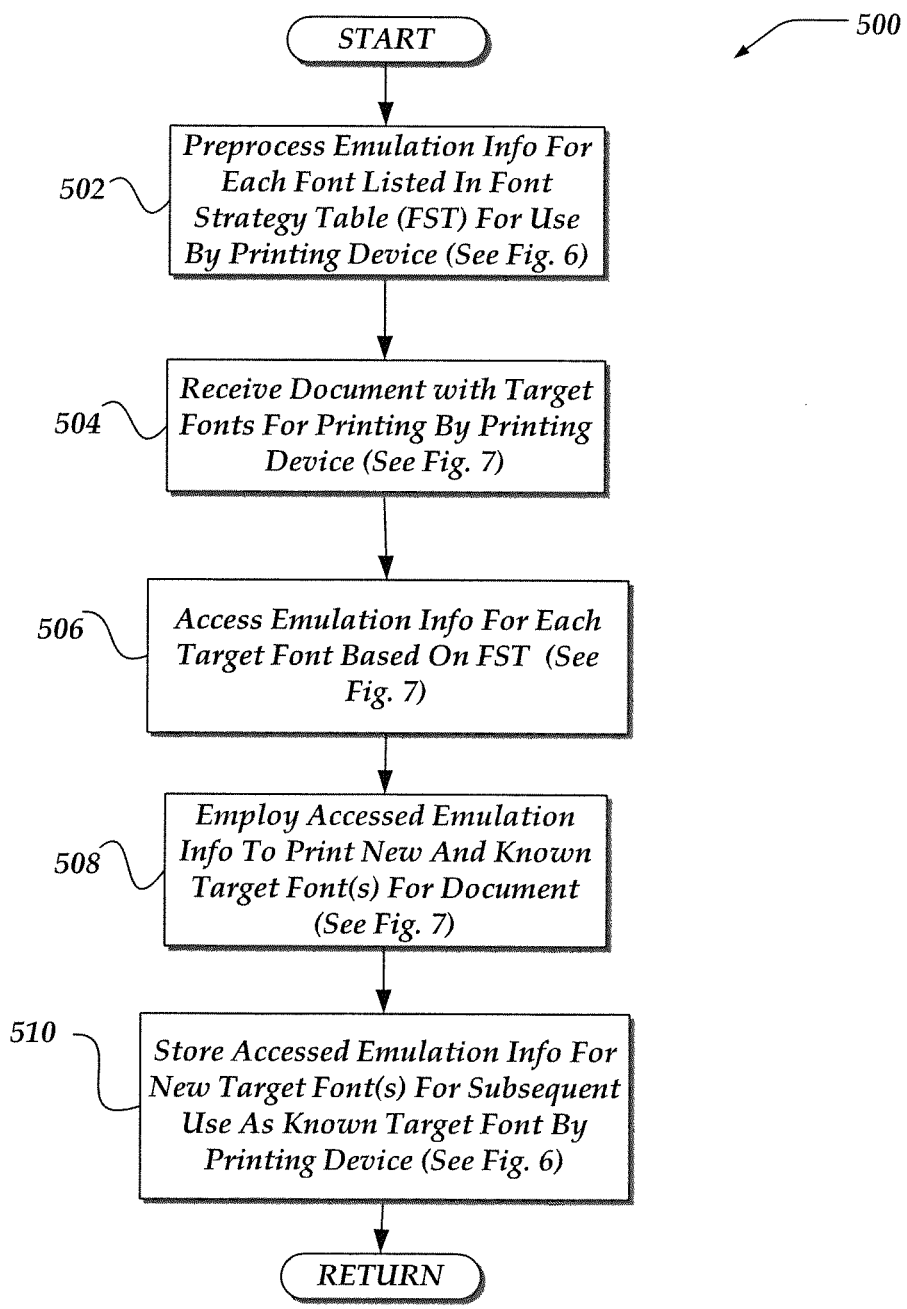
FIG. 5 illustrates a logical flow diagram generally showing one embodiment of a process for processing emulation information for fonts in documents to be printed.

FIG. 5 shows an exemplary overview process 500 that may be performed by embodiments of the claimed invention. In some embodiments, process 500 (and/or one or more of the processes depicted in FIGS. 6-9C) may be implemented by one or more applications executing on Printing device 200 of FIG. 2, Mobile device 300 of FIG. 3, and/or Network device 400 of FIG. 4.

Moving from a start block, the process flows to block 502 wherein pre-processing of emulation information for each target font reference listed in a font strategy table is performed for a particular printing device. The target font name is employed to generate a corresponding font file for each listed target font name, e.g., a TrueType font file, and generate at least three sub-set tables for each listed font, such as a Unicode mapping table, a glyph encoding table, and a character width table. An initial population of the font strategy table with target font names can be performed automatically and/or manually. Additionally, a strategy or logic for a subsequent processing of received target fonts for printing is provided for each target font name in the font strategy table. Also, new target font names, logic, and corresponding font files can be added over time if they are not initially included in the font strategy table during pre-processing. Also, greater detail regarding the sub-set tables may be found at least in the discussion regarding FIGS. 6-9C below.

Next, the process flows to block 504 where a document that includes target font references is received for printing by the printing device. At block 506, substitute font emulation information for the target font references is accessed based at least in part on the new or known target font reference(s) included in the received document and a corresponding entry in the font strategy table. Moving to block 508, the process employs the accessed emulation information for the substitute font to print the document on the printing device. Flowing to block 510, the process stores accessed information for new target font references for subsequent identification, logic and substitute font emulation information as a known font reference in the font strategy table. The process then returns to processing other actions.

Figure 6:
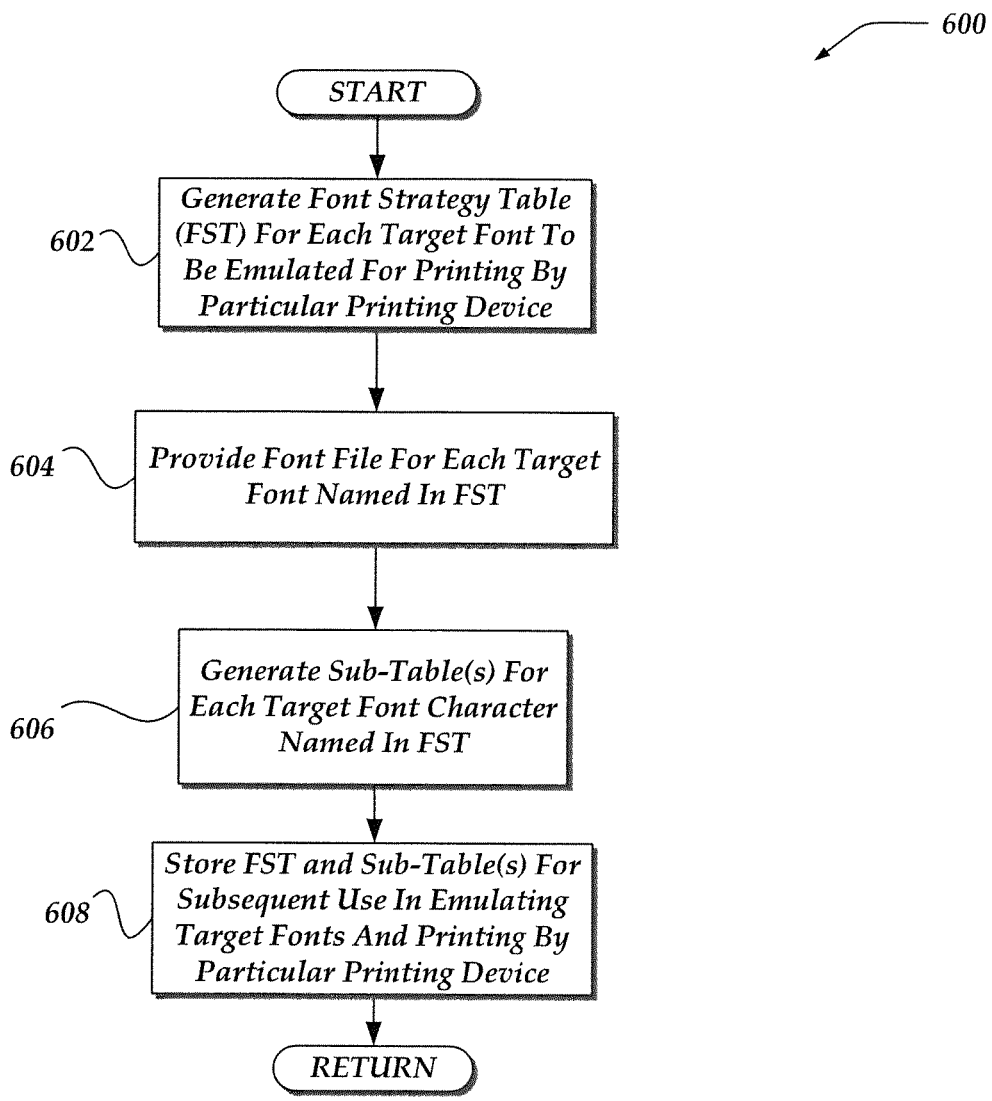
FIG. 6 illustrates a logical flow diagram generally showing one embodiment of pre-processing emulation info for fonts to be printed at a printer.

FIG. 6 illustrates an exemplary pre-processing process 600 that may be performed by embodiments of the claimed invention. In some embodiments, process 600 (and/or one or more of the processes depicted in FIGS. 5, 7-9C) may be implemented by one or more applications executing on Printing device 200 of FIG. 2, Mobile device 300 of FIG. 3, and/or Network device 400 of FIG. 4.

Moving from a start block, the process flows to block 602 to generate a font strategy table for each target font reference to be emulated for printing by a particular printing device. A target font name is provided for each entry in the font strategy table. Also, a strategy or logic for subsequent print processing of each entry in the font strategy table is provided. The original population of the font strategy table with target font names and logic can be performed automatically and/or manually. At block 604, for each target font name listed in the font strategy table, a font file such as a True Type font file is provided. Stepping to block 606, at least two sub-set tables are typically generated for each target font name character.

Flowing to block 608, the target font name entries in the font strategy table and corresponding logic, font file and sub-tables are stored for subsequent use in printing emulated target font references in a received document. Next, the process returns to processing other actions. Also, over time, new target font names, logic, and corresponding font files can be added or updated in the font strategy table even if they were not initially included in the font strategy table during pre-processing. Additionally, the entries for the target fonts in the font strategy table are selected to enable an emulation of the target font reference with another substitute font that appears visually similar, substantially preserves the original pagination and line breaks of the provided document, and the printing device has the capability to print the other substitute font.

Alternatively, in at least one embodiment, no font strategy table or a font strategy table with no entries may be provided during the pre-processing process. In this way, entries into the empty font strategy table are provided at run time, or the font strategy table and its entries are initially created during runtime and not during a pre-processing process.

Figure 7:
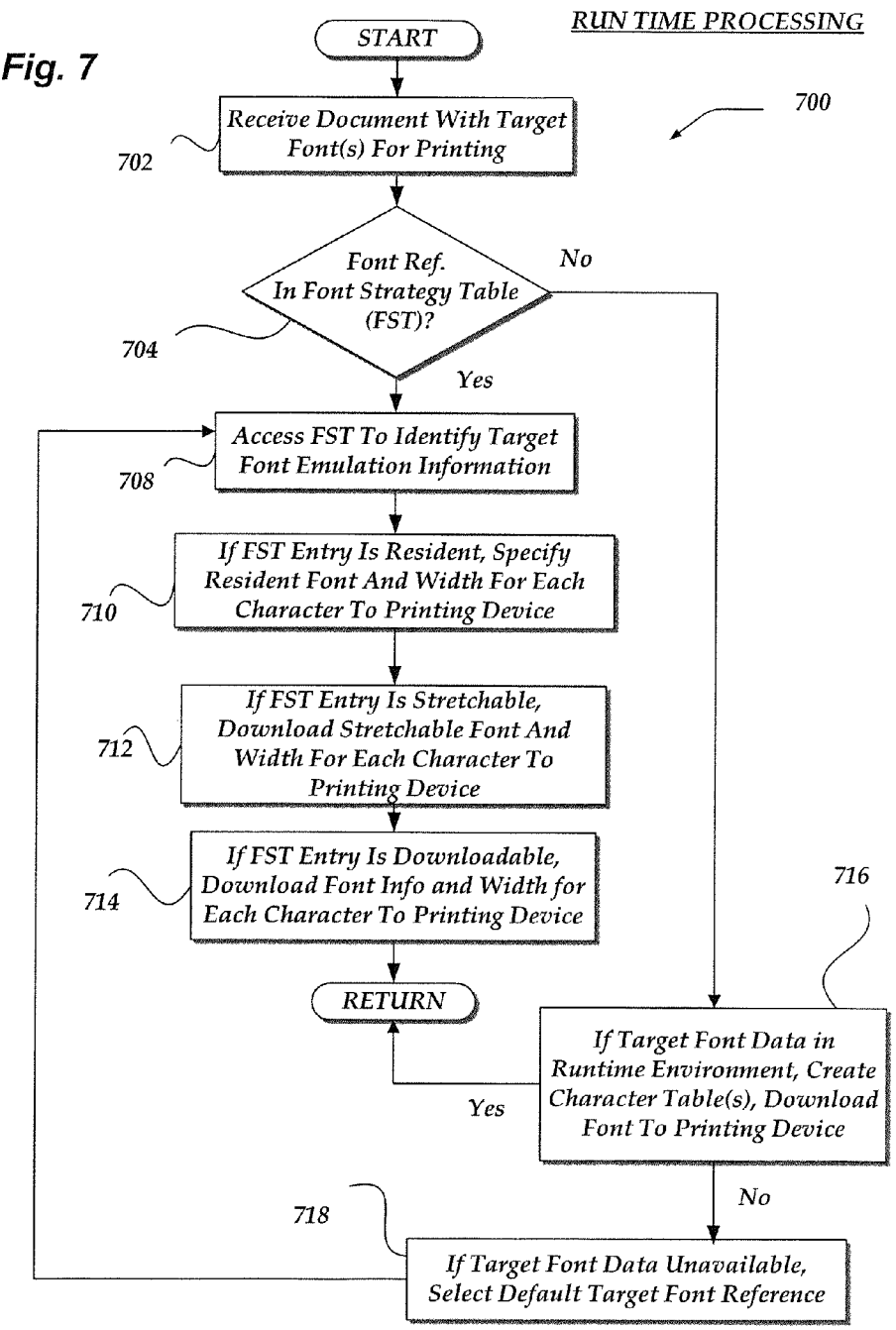
FIG. 7 illustrates a logical flow diagram generally showing one embodiment of a run time processing of emulation information for fonts to be printed at a printer.

FIG. 7 illustrates an exemplary run time processing process 700 that may be performed by embodiments of the claimed invention. In some embodiments, process 700 (and/or one or more of the processes depicted in FIGS. 5, 6, 8, and 9A-C) may be implemented by one or more applications executing on Printing device 200 of FIG. 2, Mobile device 300 of FIG. 3, and/or Network device 400 of FIG. 4.

Moving from a start block, the process flows to block 702 where a document is received with a target font reference(s). At decision block 704, a determination is made as to whether the target font reference(s) in the received document is in a font strategy table. If true, the process moves to block 708 where the font strategy table is accessed to identify target font emulation information.

Advancing to block 710, the process determines if logic corresponding to an entry in the font strategy table for the target font reference(s) indicates that emulation information is resident on the printing device. If so, the resident target font emulation information for a substitute font is specified along with a width for each character for printing at the printing device. If the process determines these actions were previously performed, at least some portion of these actions may be skipped and the emulation information is sent for printing to the printing device.

Flowing to block 712, the process determines if logic corresponding to an entry in the font strategy table for the target font reference(s) indicates that emulation information for a substitute font is a stretchable font. If affirmative, the process downloads the stretchable font information and specifies the width for each character to be printed at the printing device. The properties of the stretchable font information may include serif, height, and the like. Also, the stretchable substitute font information may include at least one tunable parameter for each character, e.g., stroke width and serif strength. Additionally, in at least one embodiment, the determined stretchable font may be a Multiple Master font, or the like. If the process determines these actions were previously performed, at least some portion of these actions may be skipped and the emulation information is sent for printing to the printing device.

Moving to block 714, the process determines if logic corresponding to an entry in the font strategy table for the target font reference(s) indicates that emulation information for a substitute font is downloadable. If true, the process downloads font information and width of each character to be provided to the printing device. Next, the process returns to performing other actions. However, at block 714, if the process determines these actions were previously performed, at least some portion of these actions may be skipped and the emulation information is sent for printing to the printing device.

Alternatively, if the determination at decision block 704 was false, the process advances to block 716. At block 716, the process determines if target font data is available in the runtime environment. If so, the process loads this data and downloads the target font data information to the printing device. Also, if the process determines these actions were previously performed, at least some portion of these actions may be skipped and the emulation information is sent for printing to the printing device.

However, if the determination at block 716, is false, the process selects a default target font reference that is available. The process loops back to block 708 and performs substantially the same process as discussed above. But if the determination at block 716 is true, then the process returns to performing other actions.

Additionally, during the runtime process for at least one embodiment, the font strategy table may be updated with a new entry indicating a target font name, logic, substitute font and character data.

Figure 8:
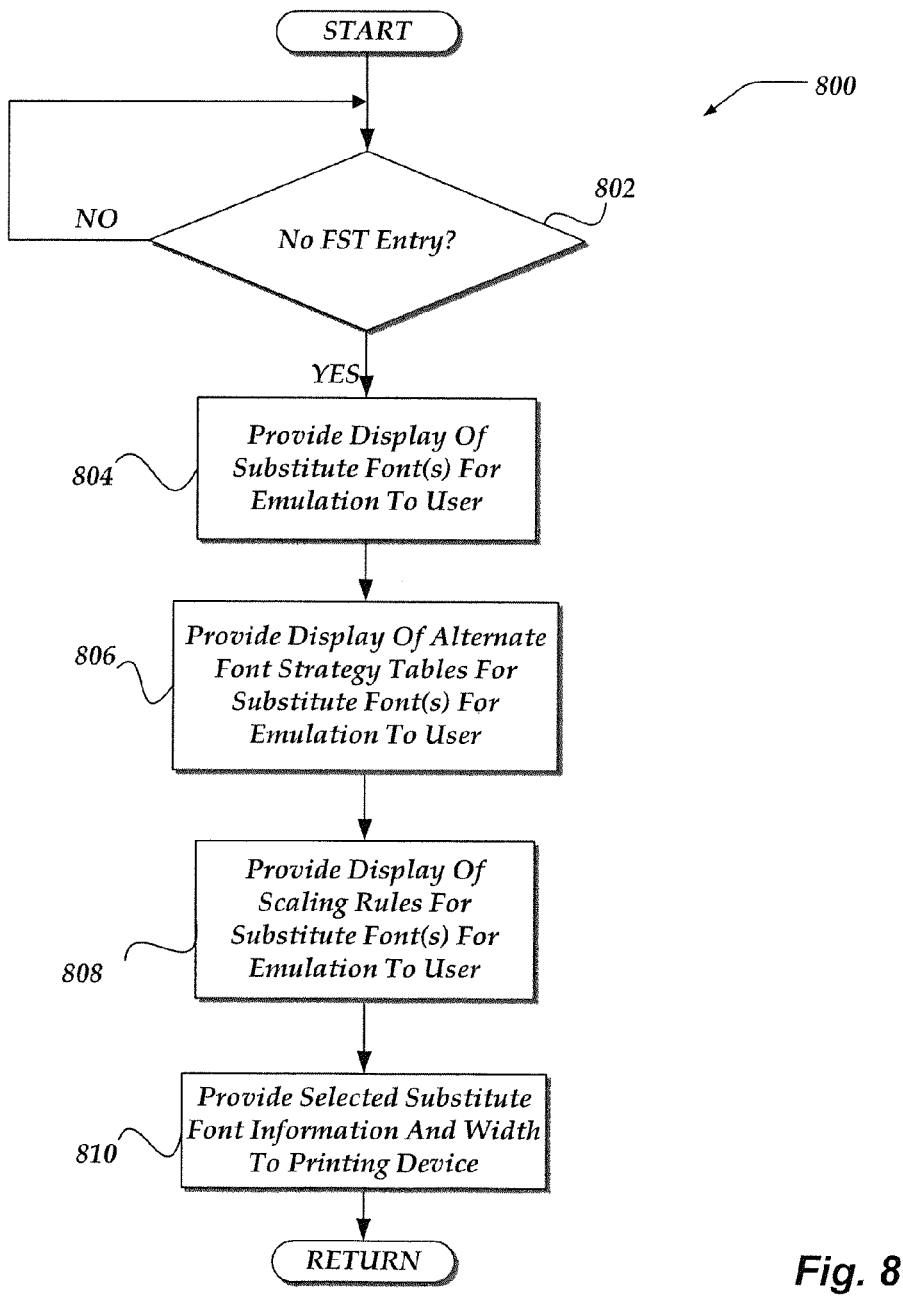
FIG. 8 illustrates a logical flow diagram generally showing one embodiment of a process for enabling a user to select substitute fonts for printing at a printer.

FIG. 8 illustrates an exemplary optional process 800 that may be performed by embodiments of the claimed invention. In some embodiments, process 800 (and/or one or more of the processes depicted in FIGS. 5-7, and 9A-9C) may be implemented by one or more applications executing on Printing device 200 of FIG. 2, mobile device 300 of FIG. 3, and/or Network device 400 of FIG. 4.

Moving from a start block, at decision block 802, the process determines if there is not an entry in the font strategy table for a target font included in a received document that is not known by the printing device. At block 804, in at least one embodiment, a plurality of substitute fonts are displayed for selection by the user. Also, in at least one embodiment, the user can purchase a substitute font for a fee. The financial transaction to purchase the selected substitute font might be performed over a network and billed to an account or a credit card associated with the user. Also, in at least one embodiment, a user's selection from the plurality of substitute fonts may be provided for free.

Flowing to block 806, a display of alternate font strategy tables are displayed for selection by the user. In at least one embodiment, the user can select a font strategy table from the plurality of font strategy tables that is identified for use with a particular printing device. At block 808, a display of scaling rules for the selected substitute font is provided for the user. In at least one embodiment, the user's selection of at least one scaling rule enables at least one of the character width and the font size (point size) to be changed for use with the printing device.

Moving to block 810, at least the user's selection of the substitute font information, and character width are provided to the printing device. Next, the process returns to performing other actions.

FIG. 9A illustrates an exemplary font strategy table 900 with entries or fields for: target font name; strategy (logic); substitute font; and character data. Typically, one font strategy table is provided per system. FIG. 9B illustrates an exemplary Character table 910 which corresponds to character data for a particular font name that is identified in an entry of the font strategy table. The exemplary sub-table 910 includes entries for ranges of unicodes, and a glyph index per font. FIG. 9C illustrates an exemplary Character table 920 which corresponds to the glyph index of Character Table 910. The exemplary Character table 920 includes at least entries for the width and glyph name per font.

The invention claimed is:

1. A method for enabling a mobile device to print a document at a printing device, comprising:

receiving the document at the mobile device, wherein the document includes text and identifies at least one target font reference for each character;

determining if a name of the target font reference is listed in a font strategy table, then employing at least one of a corresponding logic component, substitute font data, and character data to provide substitute font information and width for each character to the printing device;

determining if the name of the target font reference is unlisted in the font strategy table, then updating the font strategy table to include the name of the unlisted target font reference, wherein each updated target font reference corresponds to at least one logic component, substitute font data or character data;

generating a first character table for the target font reference that includes at least a glyph index and a unicode;

generating a second character table for the target font reference that includes at least a width and a glyph name; and enabling the printing device to employ provided font information and width for each character to print text included in the document.

2. The method of claim 1, further comprising determining if the name of the target font reference is non-listed in the font strategy table and target information is available in a runtime environment for the mobile device, then providing the target font information and width for each character to the printing device.

3. The method of claim 1, wherein the name of the target font reference is listed in the font strategy table, further determining if the font strategy table identifies a resident font at the printing device, then specifying the resident font information and width for each character to the printing device.

4. The method of claim 1, wherein if the name of the target font reference is listed in the font strategy table, further determining if the font strategy table identifies a stretchable font, then providing the stretchable font information and width for each character to the printing device.

5. The method of claim 1, wherein if the name of the target font reference is listed in the font strategy table, further determining if the font strategy table identifies a downloadable font, then providing the downloadable font information and width for each character to the printing device.

6. The method of claim 1, further comprising determining if the name of the target font reference is non-listed in the font strategy table and unavailable, then providing default font information and width for each character to the printing device.

7. An apparatus for enabling a document to print at a printing device, comprising:

a network interface that is arranged to communicate information over a network;

a memory that is operative to store and provide access to information;

a processor that executes instructions that enable actions, including:

receiving the document, wherein the document includes text and identifies at least one target font reference for each character;

determining if a name of the target font reference is listed in a font strategy table, then employing at least one of a corresponding logic component, substitute font data, and character data to provide substitute font information and width for each character to the printing device;

determining if the name of the target font reference is unlisted in the font strategy table, then updating the font strategy table to include the name of the unlisted target font reference, wherein each updated target font reference corresponds to at least one logic component, substitute font data or character data;

generating a first character table for the target font reference that includes at least a glyph index and a unicode;

generating a second character table for the target font reference that includes at least a width and a glyph name; and enabling the printing device to employ provided font information and width for each character to print text included in the document.

8. The apparatus of claim 7, wherein the actions further comprise determining if the name of the target font reference is non-listed in the font strategy table and target font information is available in a runtime environment for the mobile device, then providing the target font information and width for each character to the printing device.

9. The apparatus of claim 7, wherein the processor performs further actions including it the name of the target font reference is listed in the font strategy table, further determining if the font strategy table identifies a resident font at the printing device, then specifying the resident font information and width for each character to the printing device.

10. The apparatus of claim 7, wherein the processor performs further actions including if the name of the target font reference is listed in the font strategy table, further determining if the font strategy table identifies a stretchable font, then providing the stretchable font information and width for each character to the printing device.

11. The apparatus of claim 7, wherein the processor performs further actions including if the name of the target font reference is listed in the font strategy table, further determining if the font strategy table identifies a downloadable font, then providing the downloadable font information and width for each character to the printing device.

12. The apparatus of claim 7, wherein the processor performs further actions including determining if the name of the target font reference is non-listed in the font strategy table and unavailable, then providing default font information and width for each character to the printing device.

13. A system for printing a document, comprising:
a printing device that is operative to print the document;
a mobile device, comprising:
  a network interface that is arranged to communicate information over a network;
  a memory that is operative to store and provide access to information;
  a processor that executes instructions that enable actions, including:
    receiving the document, wherein the document includes text and identifies at least one target font reference for each character;
    determining if a name of the target font reference is listed in a font strategy table, then employing at least one of a corresponding logic component, substitute font data, and character data to provide substitute font information and width for each character to the printing device;
    determining if the name of the target font reference is unlisted in the font strategy table, then updating the font strategy table to include the name of the unlisted target font reference, wherein each updated target font reference corresponds to at least one logic component, substitute font data or character data;
    generating a first character table for the target font reference that includes at least a glyph index and a unicode;
    generating a second character table for the target font reference that includes at least a width and a glyph name; and
    enabling the printing device to employ provided font information and width for each character to print text included in the document.

14. The system of claim 13, wherein the actions further comprise determining if the name of the target font reference is non-listed in the font strategy table and target font information is available in a runtime environment for the mobile device, then providing the target font information and width for each character to the printing device.

15. The system of claim 13, wherein the processor performs further actions including if the name of the target font reference is listed in the font strategy table, further determining if the font strategy table identifies a resident font at the printing device, then specifying the resident font information and width for each character to the printing device.

16. The system of claim 13, wherein the processor performs further actions including if the name of the target font reference is listed in the font strategy table, further determining if the font strategy table identifies a stretchable font, then providing the stretchable font information and width for each character to the printing device.

17. The system of claim 13, wherein the processor performs further actions including if the name of the target font reference is listed in the font strategy table, further determining if the font strategy table identifies a downloadable font, then providing the downloadable font information and width for each character to the printing device.

18. The system of claim 13, wherein the processor performs further actions including determining if the name of the target font reference is non-listed in the font strategy table and unavailable, then providing default font information and width for each character to the printing device.

19. A processor readable non-transitive storage media that includes data and instructions, wherein the execution of the instructions enables actions for printing a document at a printing device, comprising:
receiving the document at a networked device, wherein the document includes text and identifies at least one target font reference for each character;
determining if a name of the target font reference is listed in a font strategy table, then employing at least one of a corresponding logic component, substitute font data, and character data to provide substitute font information and width for each character to the printing device;
determining if the name of the target font reference is unlisted in the font strategy table, then updating the font strategy table to include the name of the unlisted target font reference, wherein each updated target font reference corresponds to at least one logic component, substitute font data or character data;
generating a first character table for the target font reference that includes at least a glyph index and a unicode;
generating a second character table for the target font reference that includes at least a width and a glyph name; and
enabling the printing device to employ provided font information and width for each character to print text included in the document.

20. The media of claim 19, wherein the actions further comprise determining if the name of the target font reference is non-listed in the font strategy table and target font information is available in a runtime environment for the networked device, then providing the target font information and width for each character to the printing device.

21. The media of claim 19, wherein if the name of the target font reference is listed in the font strategy table, further determining if the font strategy table identifies a resident font at the printing device, then specifying the resident font information and width for each character to the printing device.

22. The media of claim 19, wherein if the name of the target font reference is listed in the font strategy table, further determining if the font strategy table identifies a stretchable font, then providing the stretchable font information and width for each character to the printing device.

23. The media of claim 19, wherein if the name of the target font reference is listed in the font strategy table, further determining if the font strategy table identifies a downloadable font, then providing the downloadable font information and width for each character to the printing device.

24. The media of claim 19, further comprising determining if the name of the target font reference is non-listed in the font strategy table and unavailable, then providing default font information and width for each character to the printing device.

\* \* \* \* \*